(12) United States Patent
Wada et al.

(10) Patent No.: US 12,407,275 B2
(45) Date of Patent: Sep. 2, 2025

(54) POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Yuhei Wada, Chuo-ku (JP); Jumpei Isozaki, Chuo-ku (JP); Taichiro Tsuchiya, Chuo-ku (JP)

(73) Assignee: TMEIC CORPORATION, Chuo-ku (JP)

( * ) Notice: Subject to any disclaimer, the term of this patent is extended or adjusted under 35 U.S.C. 154(b) by 0 days.

(21) Appl. No.: 18/555,893

(22) PCT Filed: Feb. 16, 2022

(86) PCT No.: PCT/JP2022/006148
§ 371 (c)(1),
(2) Date: Oct. 18, 2023

(87) PCT Pub. No.: WO2023/157120
PCT Pub. Date: Aug. 24, 2023

(65) Prior Publication Data
US 2024/0213888 A1 Jun. 27, 2024

(51) Int. Cl.
*H02M 7/53* (2006.01)
*H02M 7/00* (2006.01)
*H02M 7/5387* (2007.01)

(52) U.S. Cl.
CPC ....... *H02M 7/53871* (2013.01); *H02M 7/003* (2013.01)

(58) Field of Classification Search
CPC ..... H02M 7/53871; H02M 7/53; H02M 7/003
See application file for complete search history.

(56) References Cited

U.S. PATENT DOCUMENTS

2025/0182964 A1* 6/2025 Yamane ................... H01G 2/02

FOREIGN PATENT DOCUMENTS

JP 2020-89121 A 6/2020

OTHER PUBLICATIONS

International Search Report issued Mar. 22, 2022 in PCT/JP2022/006148 filed on Feb. 16, 2022, 2 pages.

* cited by examiner

*Primary Examiner* — Adolf D Berhane
(74) *Attorney, Agent, or Firm* — Oblon, McClelland, Maier &Neustadt, L.L.P.

(57) ABSTRACT

First to third capacitors each have an identical shape of a rectangular parallelepiped. The rectangular parallelepiped has a first surface with a first side and a second side, a second surface with the second side and a third side, and a third surface with the third side and the first side. The first side has a length not less than twice and less than three times a length of the third side. The first and second capacitors are arranged such that the first surfaces thereof are perpendicular to an installation surface, the first surfaces face each other, and the second surfaces are horizontal to the installation surface. The third capacitor is arranged such that the first surface thereof faces the second surfaces of the first and second capacitors and the third surface thereof is flush with the third surfaces of the first and second capacitors.

5 Claims, 11 Drawing Sheets

POWER CONVERSION APPARATUS

TECHNICAL FIELD

The present disclosure relates to a power conversion apparatus.

BACKGROUND ART

Japanese Patent Laying-Open No. 2020-089121 (PTL 1) discloses a power conversion apparatus connected between an alternating-current (AC) circuit and a direct-current (DC) circuit. The power conversion apparatus includes a power converter including a plurality of switching elements, and a plurality of capacitors connected in parallel. The plurality of capacitors smooth a voltage switched by the switching elements. Alternatively, the plurality of capacitors maintain a DC voltage switched by the switching elements. The plurality of capacitors are shaped into rectangular parallelepipeds of the same dimensions and are aligned in the same orientation such that a surface of each capacitor faces a surface of another capacitor.

CITATION LIST

Patent Literature

PTL 1: Japanese Patent Laying-Open No. 2020-089121

SUMMARY OF INVENTION

Technical Problem

In the power conversion apparatus described above, a current that fluctuates cyclically flows through each of the plurality of capacitors in response to a switching operation of the plurality of capacitors during operation of the power converter. Inside each capacitor, a power loss occurs that is given by the product of the equivalent series resistance (ESR) and the square of the current, leading to heat generation of the capacitor. Such heat generation due to the power loss leads to a temperature increase in the capacitor, which may accelerate performance degradation of the capacitor. Thus, the cooling performance of each capacitor needs to be ensured.

On the other hand, the size of the power conversion apparatus may be increased by securing a path for releasing heat generated by each capacitor in the power conversion apparatus.

The present disclosure has been made to solve the above problem. An object of the present disclosure is to provide a power conversion apparatus that can ensure the cooling performance of a capacitor without increasing the size of the power conversion apparatus.

Solution to Problem

A power conversion apparatus according to an aspect of the present disclosure includes a DC circuit and a power converter. The power converter includes a plurality of switching elements and converts power between the DC circuit and an AC circuit by a switching operation of the plurality of switching elements. The DC circuit includes a first capacitor, a second capacitor, and a third capacitor connected in parallel. The first capacitor, the second capacitor, and the third capacitor each have an identical shape of a rectangular parallelepiped. The rectangular parallelepiped has a pair of first surfaces facing each other, a pair of second surfaces facing each other, and a pair of third surfaces facing each other. Each of the pair of first surfaces has a first side and a second side orthogonal to each other. Each of the pair of second surfaces has the second side and a third side orthogonal to each other. Each of the pair of third surfaces has the third side and the first side orthogonal to each other. The first side has a length not less than twice and less than three times a length of the third side. Each of the first capacitor and the second capacitor is arranged such that the pair of first surfaces thereof are perpendicular to an installation surface and the second surfaces thereof are horizontal to the installation surface. One of the pair of first surfaces of the first capacitor faces one of the pair of first surfaces of the second capacitor while being spaced apart from each other. The third capacitor is arranged such that one of the pair of first surfaces thereof faces one of the pair of second surfaces of the first capacitor and one of the pair of second surfaces of the second capacitor while being spaced apart from each other and one of the pair of third surfaces thereof is flush with one of the pair of third surfaces of the first capacitor and one of the pair of third surfaces of the second capacitor.

Advantageous Effects of Invention

According to the present disclosure, a power conversion apparatus can be provided that can ensure the cooling performance of a capacitor without increasing the size of the power conversion apparatus.

DESCRIPTION OF EMBODIMENTS

Figure 1:
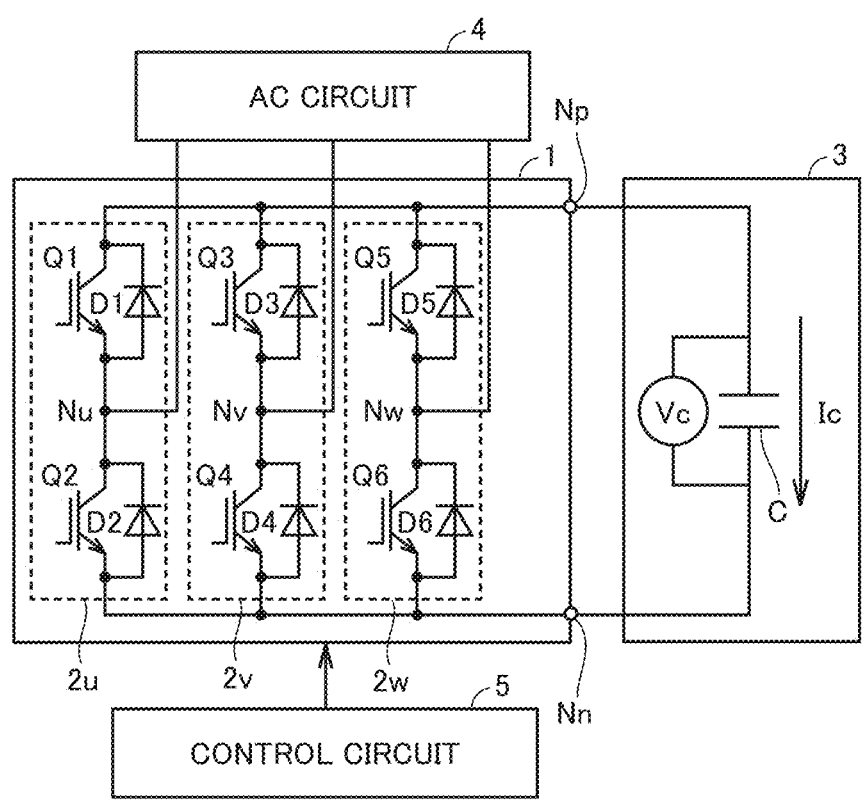
FIG. 1 is a circuit block diagram showing an example configuration of a power conversion apparatus according to an embodiment.

The embodiments of the present disclosure will be described below in detail with reference to the accompanying drawings. In the following description, the same or corresponding components are designated by the same reference characters, and description thereof will not be basically repeated.

FIG. 1 is a circuit block diagram showing an example configuration of a power conversion apparatus according to an embodiment. As shown in FIG. 1, the power conversion apparatus includes a power converter 1, a DC circuit 3, and a control circuit 5.

Power converter 1 is a voltage source inverter, which converts power between AC circuit 4 and DC circuit 3. Power converter 1 includes a plurality of leg circuits 2u, 2v, 2w connected in parallel with each other between a positive DC terminal (i.e., high-potential-side DC terminal) Np and a negative DC terminal (i.e., low-potential-side DC terminal) Nn. In the description below, leg circuits 2u, 2v, 2w are described as leg circuit 2 when they are collectively referred to.

Leg circuit 2 is provided for each of a plurality of phases of an alternating current. FIG. 1 shows a case where AC circuit 4 is a three-phase AC system, and three leg circuits 2u, 2v, 2w are provided corresponding to a U-phase, a V-phase, and a W-phase, respectively.

AC input terminals Nu, Nv, Nw provided respectively in leg circuits 2u, 2v, 2w are connected to AC circuit 4. AC circuit 4 is, for example, an AC power system including a transformer, an AC power supply, and the like.

High-potential-side DC terminal Np and low-potential-side DC terminal Nn connected in common to each leg circuit 2 are connected to DC circuit 3. DC circuit 3 is, for example, a DC terminal of a DC power system or any other power conversion apparatus.

Power converter 1 includes a plurality of switching elements Q1 to Q6 and a plurality of diodes D1 to D6. Specifically, leg circuit 2u includes switching elements Q1, Q2 connected in series with each other, and diodes D1, D2 connected in antiparallel with switching elements Q1, Q2, respectively. AC input terminal Nu, which is a point of connection between switching elements Q1, Q2, is connected to AC circuit 4.

Leg circuit 2v includes switching elements Q3, Q4 connected in series with each other, and diodes D3, D4 connected in antiparallel with switching elements Q3, Q4, respectively. AC input terminal Nv, which is a point of connection between switching elements Q3, Q4, is connected to AC circuit 4.

Leg circuit 2w includes switching elements Q5, Q6 connected in series with each other, and diodes D5, D6 connected in antiparallel with switching elements Q5, Q6, respectively. AC input terminal Nw, which is a point of connection between switching elements Q5, Q6, is connected to AC circuit 4.

Each of switching elements Q1 to Q6 is a self-turn-off switching element that can control a switching operation. For example, switching elements Q1 to Q6 are insulated gate bipolar transistors (IGBTs), metal oxide semiconductor field effect transistors (MOSFETs), or gate commutated turn-off thyristors (GCTs).

Power converter 1 is not to limited to a circuit configuration shown in FIG. 1 and may have any other circuit configuration in which DC circuit 3 is connected between DC terminals Np, Nn.

DC circuit 3 includes a capacitor C. Capacitor C is connected between DC terminals Np, Nn and maintains a DC voltage (hereinafter also referred to as "capacitor voltage") Vc between DC terminals Np, Nn. An instantaneous value of capacitor voltage Vc is detected by control circuit 5. Capacitor C may be, for example, an electrolytic capacitor or a film capacitor. In high-voltage, high-capacity application, capacitor C is mostly a film capacitor of the shape of a rectangular parallelepiped.

Control circuit 5 controls power conversion in power converter 1. Specifically, control circuit 5 controls a switching operation of switching elements Q1 to Q6 based on an AC voltage supplied from AC circuit 4, capacitor voltage Vc, and the like. In this case, control circuit 5 controls power converter 1 such that capacitor voltage Vc attains to a desired target voltage.

In response to the switching operation of switching elements Q1 to Q6 in power converter 1, a current (hereinafter also referred to as "capacitor current") Ic flowing through capacitor C and capacitor voltage Vc cyclically fluctuate in synchronization with this switching operation.

Specifically, during operation of power converter 1, capacitor C is repeatedly charged and discharged in response to the switching operation of switching elements Q1 to Q6, and accordingly, capacitor current Ic cyclically increases or decreases. Capacitor current Ic is also referred to as a ripple current. The cycle in which capacitor current Ic increases or decreases coincides with the switching cycle of switching elements Q1 to Q6.

A power loss given by the product of the ESR and the square of capacitor current Ic occurs inside capacitor C, and thus, capacitor C generates heat. Such heat generation due to the power loss may increase the temperature of capacitor C, accelerating performance degradation of capacitor C. Thus, the temperature increase of capacitor C needs to be restrained to be an allowable value or less.

As capacitor current Ic cyclically increases or decreases, capacitor voltage Vc also cyclically fluctuates. While capacitor current Ic is positive, capacitor voltage Vc increases because capacitor C is charged. While capacitor current Ic is negative, capacitor voltage Vc decreases because capacitor C is discharged. Such voltage fluctuations are superimposed on the DC voltage.

Herein, a range of fluctuations ΔVc can be expressed by $\Delta Vc = 1/C \cdot \int Ic\, dt$, where ΔVc is a range of fluctuations of capacitor voltage Vc and C is an electrostatic capacity of capacitor C. In other words, range of fluctuations ΔVc of capacitor voltage Vc is inversely proportional to the electrostatic capacity of capacitor C. Thus, fluctuations of capacitor voltage Vc can be reduced by increasing the electrostatic capacity of capacitor C.

On the other hand, there are limitations on the manufacturable size and weight of the capacitor in manufacture, and accordingly, increasing electrostatic capacity by a single capacitor has limitations. Therefore, the present embodiment achieves a desired electrostatic capacity for the entire capacitor by adopting a configuration in which a plurality of unit capacitors are connected in parallel.

Figure 2:
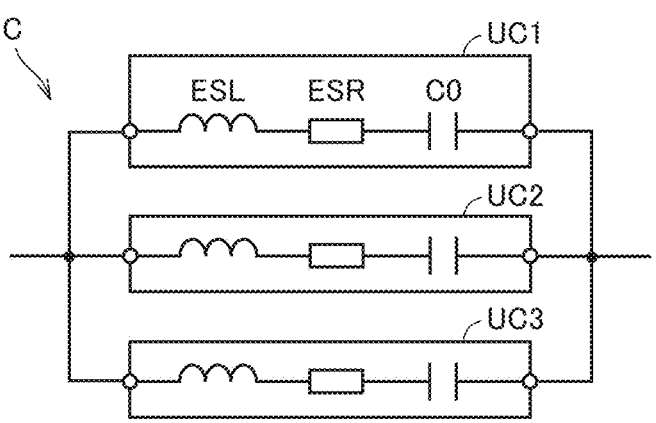
FIG. 2 is an equivalent circuit diagram of a capacitor shown in FIG. 1.

FIG. 2 is an equivalent circuit diagram of capacitor C shown in FIG. 1. As shown in FIG. 2, capacitor C includes three unit capacitors UC1 to UC3 connected in parallel. Unit capacitors UC1 to UC3 have the same configuration (electrostatic capacity and shape). Unit capacitor UC1 corresponds to one embodiment of the "first capacitor", unit capacitor UC2 corresponds to one embodiment of the "second capacitor", and unit capacitor UC3 corresponds to one embodiment of the "third capacitor". In the description below, unit capacitors UC1 to UC3 are also described as unit capacitor UC when they are collectively referred to.

An equivalent circuit of unit capacitor UC can be expressed as a series circuit of an electrostatic capacity CO, an ESR, and an equivalent series inductance (ESL). Connecting three unit capacitors UC1 to UC3 in parallel as shown in FIG. 2 results in the overall electrostatic capacity of capacitor C which is three times C0. In other words, it suffices that electrostatic capacity C0 of each unit capacitor UC is a third of the overall electrostatic capacity required for capacitor C.

A current, which increases or decreases at a cycle equal to the switching cycle of the switching elements in power converter 1, flows through each unit capacitor UC. A power loss given by the product of the square of this current and the ESR occurs, and accordingly, unit capacitor UC generates heat. In order to reduce or prevent performance degradation of capacitor C, each unit capacitor UC need to be cooled as appropriate.

Figure 3:
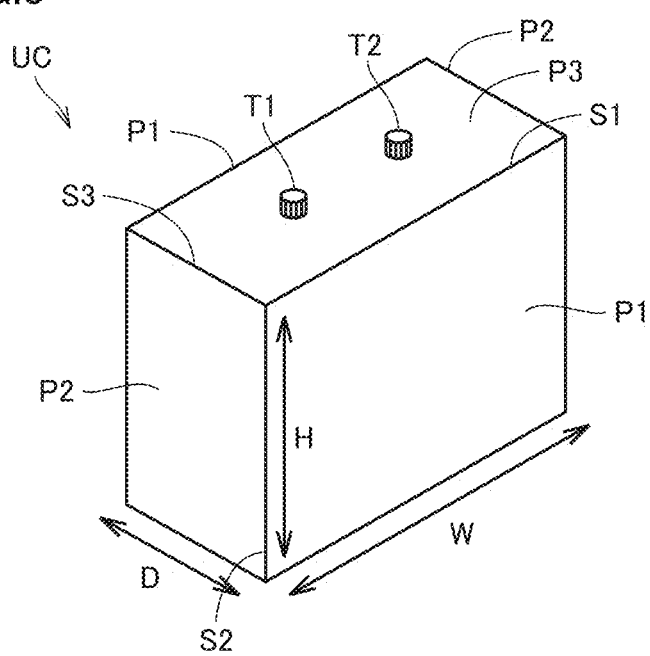
FIG. 3 shows an external appearance of a unit capacitor.

FIG. 3 shows an external appearance of unit capacitor UC. As shown in FIG. 3, unit capacitor UC has a shape of a rectangular parallelepiped. Unit capacitor UC is, for example, a film capacitor.

The rectangular parallelepiped forming unit capacitor UC has a pair of first surfaces P1 facing each other, a pair of second surfaces P2 facing each other, and a pair of third surfaces P3 facing each other. First surface P1 has a first side S1 and a second side S2 orthogonal to each other. Second surface P2 has second side S2 and a third side orthogonal to each other. Third surface P3 has first side S1 and third side S3 orthogonal to each other.

Two terminals T1, T2 are installed on third surface P3. One of terminals T1, T2 is electrically connected to high-potential-side DC terminal Np of power converter 1. The other of terminals T1, T2 is electrically connected to low-potential-side DC terminal Nn of power converter 1.

In the description below, the length of first side S1 is W, the length of second side S2 is H, and the length of third side S3 is D. Since W is larger than D, the area of first surface P1 is larger than the area of second surface P2. W and D are set to satisfy the relation $D \times 2 \leq W \leq D \times 3$. The relation between W and D will be described later.

Figure 4:
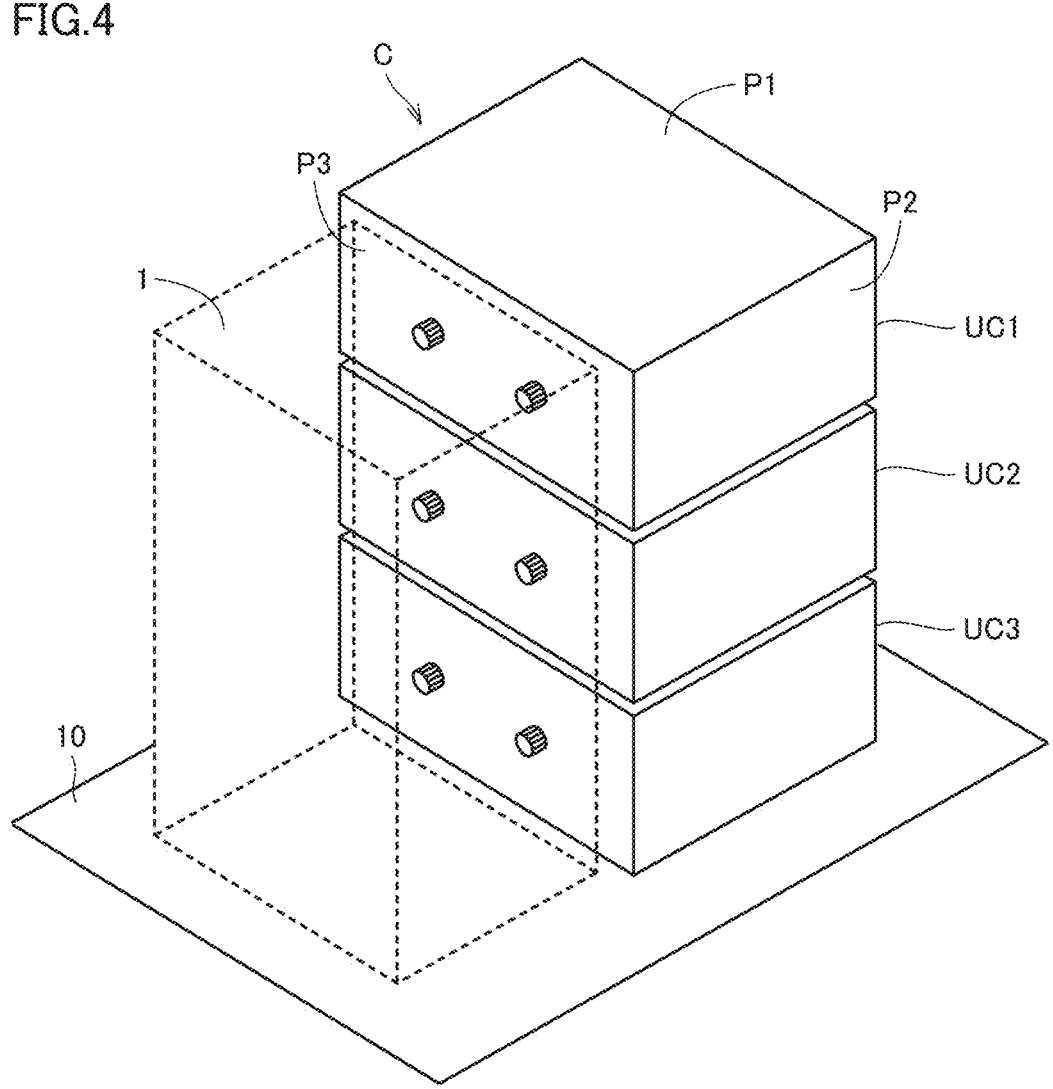
FIG. 4 schematically shows an example arrangement of a power converter and unit capacitors according to a first comparative example.
Figure 6:
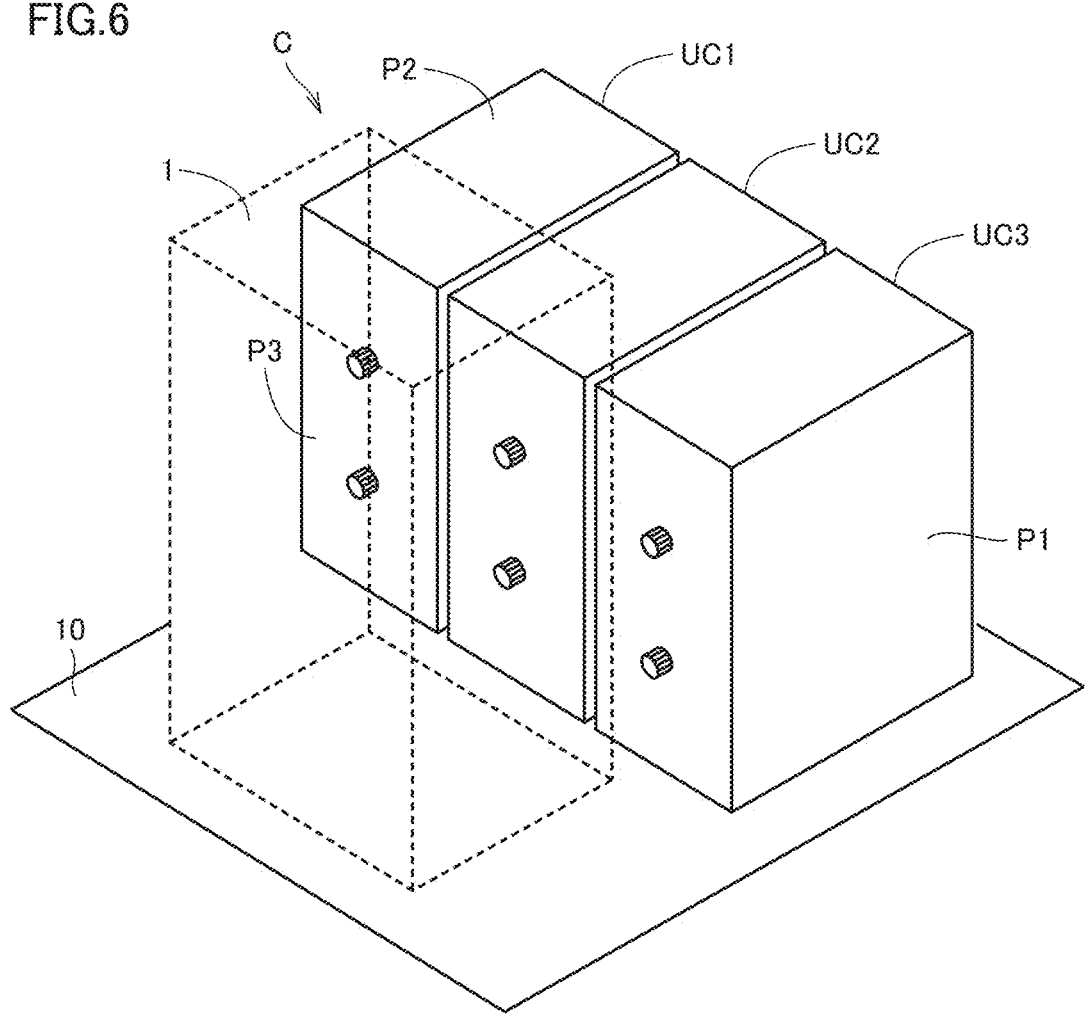
FIG. 6 schematically shows an example arrangement of a power converter and unit capacitors according to a second comparative example.
Figure 8:
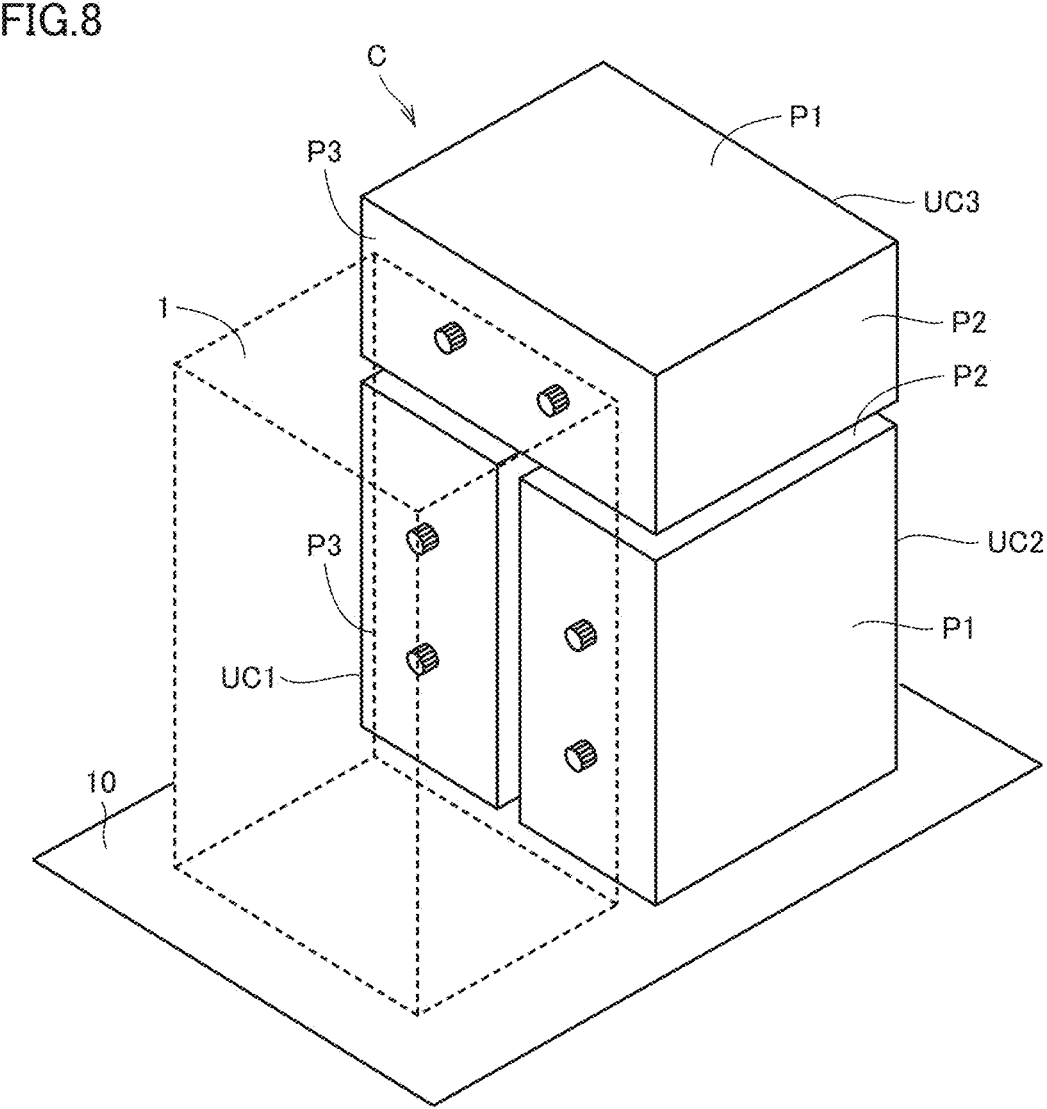
FIG. 8 schematically shows an example arrangement of a power converter and unit capacitors according to the present embodiment.

Next, the arrangement of power converter 1 and capacitor C (unit capacitors UC1 to UC3) in the power conversion apparatus shown in FIG. 1 will be described. FIGS. 4, 6, and 8 schematically show example arrangements of power converter 1 and unit capacitors UC1 to UC3. In any of the example arrangements, power converter 1 has the external shape of a rectangular parallelepiped and is installed on the installation surface as unit capacitors UC1 to UC3.

In the present embodiment, the heat generated by unit capacitors UC1 to UC3 is released by natural convection. In other words, unit capacitors UC1 to UC3 are naturally cooled.

The example arrangement shown in FIG. 8 is an example arrangement according to the present embodiment. The example arrangements shown in FIGS. 4 and 6 correspond to a first comparative example and a second comparative example, respectively, for the example arrangement according to the present embodiment. The example arrangements according to the comparative examples will now be described with reference to FIGS. 4 and 6.

FIG. 4 schematically shows an example arrangement of power converter 1 and unit capacitors UC1 to UC3 according to the first comparative example. In the first comparative example shown in FIG. 4, unit capacitors UC1 to UC3 are vertically stacked on one another with respect to installation surface 10. A clearance is formed between two unit capacitors UC vertically adjacent to each other.

First surfaces P1 of each of unit capacitors UC1 to UC3 are horizontal to installation surface 10. Third surfaces P3 of unit capacitors UC1 to UC3 face power converter 1 and are flush with each other.

In the first comparative example, the installation area of capacitor C can be equal to the installation area of one unit capacitor UC (i.e., the area of first surface P1). It is, however, feared that the cooling performance of some unit capacitors UC may decrease.

Figure 5:
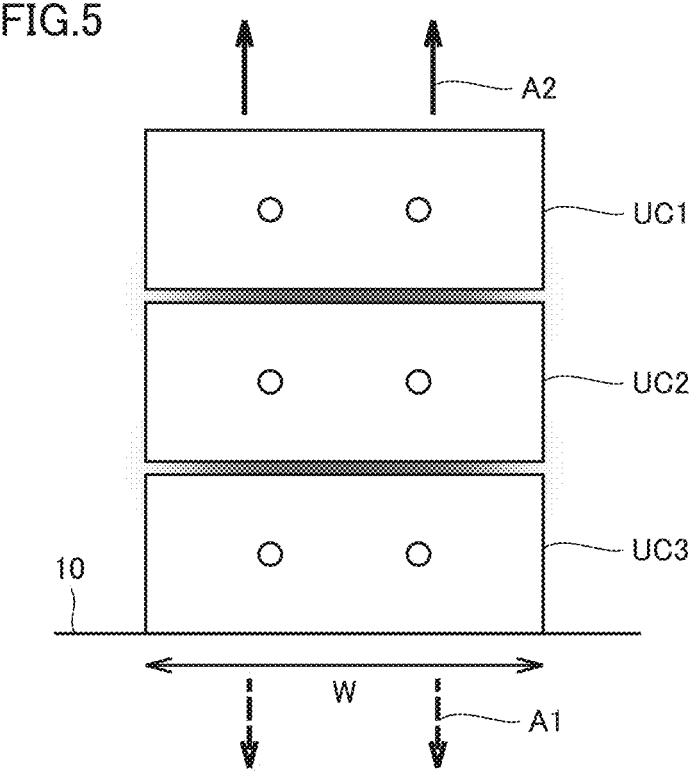
FIG. 5 schematically shows heat dissipation of the unit capacitors in the first comparative example.

FIG. 5 schematically shows heat dissipation of unit capacitors UC1 to UC3 in the first comparative example. In the figure, the broken arrows A1 indicate heat transfer, and the solid arrows A2 indicate an airflow.

Referring to FIG. 5, the heat generated in unit capacitor UC is released outside unit capacitor UC. The heat generated in unit capacitor UC3 is conducted from first surface P1 to installation surface 10, and accordingly, is mainly released toward installation surface 10.

The heat generated in unit capacitor UC1 is transferred to the air around unit capacitor UC1. As the air is warmed, the air rises, thereby creating an airflow vertically upward by natural convection. As a result, the heat generated in unit capacitor UC1 is mainly released vertically upward from first surface P1.

On the other hand, unit capacitor UC2 is vertically sandwiched between unit capacitors UC1, UC3, and thus, cannot externally release heat. As a result, the temperature of unit capacitor UC2 may increase, causing performance degradation.

In order to increase the cooling performance of unit capacitor UC2 in the first comparative example, a technique can be adopted that increases a clearance between the adjacent unit capacitors UC to ensure a flow path for the air warmed by the heat from unit capacitor UC2. However, increasing the clearance between unit capacitors UC will increase the overall vertical length of capacitor C.

FIG. 6 schematically shows an example arrangement of power converter 1 and unit capacitors UC1 to UC3 according to the second comparative example. In the second comparative example shown in FIG. 6, unit capacitors UC1 to UC3 are arranged horizontally side by side with respect to installation surface 10. A clearance is formed between two unit capacitors UC horizontally adjacent to each other.

Second surfaces P2 of unit capacitors UC1 to UC3 are in contact with installation surface 10. First surfaces P1 of each of unit capacitors UC1 to UC3 are perpendicular to installation surface 10. Third surfaces P3 of unit capacitors UC1 to UC3 face power converter 1 and are flush with each other.

In the second comparative example, the installation area of capacitor C is equal to the sum of the installation areas of three unit capacitors UC1 to UC3 (i.e., the areas of second surfaces P2), and accordingly, is larger than the installation area of capacitor C in the first comparative example. Specifically, the horizontal length of capacitor C is equal to a length three times the length of third side S3 plus twice a size a of the clearance ($D \times 3 + \alpha \times 2$). Thus, the horizontal length of capacitor C may be larger than the horizontal length of power converter 1 as shown in FIG. 6.

Figure 7:
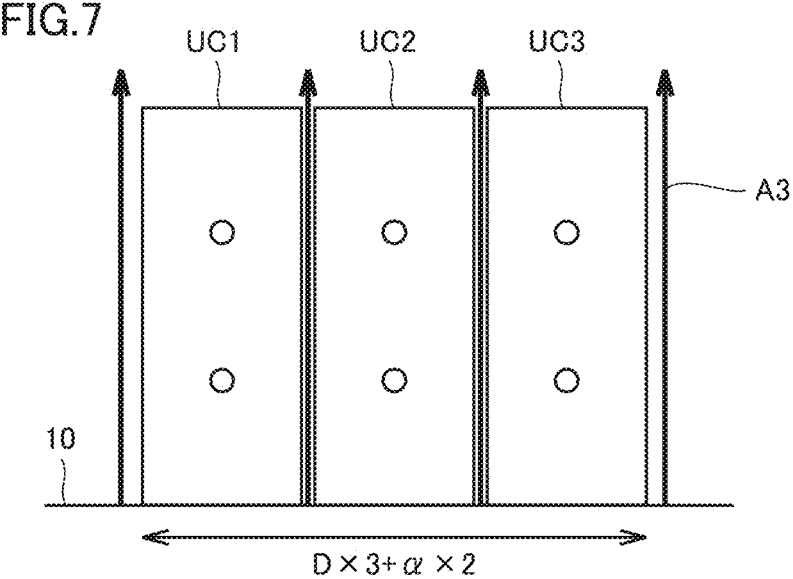
FIG. 7 schematically shows heat dissipation of the unit capacitors in the second comparative example.

On the other hand, in the second comparative example, the heat generated in each of unit capacitors UC1 to UC3 can be released. FIG. 7 schematically shows heat dissipation of unit capacitors UC1 to UC3 in the second comparative example. The solid arrows A3 in the figure indicate an airflow.

As shown in FIG. 7, the heat generated in each unit capacitor UC is transferred through first surfaces P1 to the air on the opposite horizontal ends of unit capacitor UC. As the air is warmed by this heat, an airflow is created vertically upward by natural convection.

The heat generated in unit capacitor UC2 is transferred to the airflow in the clearance on the opposite horizontal ends through first surfaces P1 and is released vertically upward. Thus, the cooling performance of unit capacitor UC2 can be improved more in the second comparative example than in the first comparative example.

On the other hand, the second comparative example has a problem of an increase in the installation area of capacitor C (in particular, the horizontal length of capacitor C), as described above. The example arrangement according to the present embodiment solves the problems in the first comparative example and the second comparative example.

FIG. 8 schematically shows an example arrangement of power converter 1 and unit capacitors UC1 to UC3 according to the present embodiment. As shown in FIG. 8, in the example arrangement according to the present embodiment, unit capacitor UC1 and unit capacitor UC2 are horizontally arranged side by side with respect to installation surface 10. A clearance is formed between unit capacitor UC1 and unit capacitor UC2.

First surfaces P1 of each of unit capacitors UC1, UC2 are perpendicular to installation surface 10. First surface P1 of unit capacitor UC1 and first surface P1 of unit capacitor UC2 face each other while being spaced apart from each other. Second surfaces P2 of unit capacitors UC1, UC2 are horizontal to installation surface 10 and are flush with each other.

Unit capacitor UC3 is arranged such that first surface P1 thereof faces second surfaces P2 of unit capacitors UC1, UC2 while being spaced apart from each other. Third surfaces P3 of unit capacitors UC1 to UC3 face power converter 1 and are flush with each other.

Figure 9:
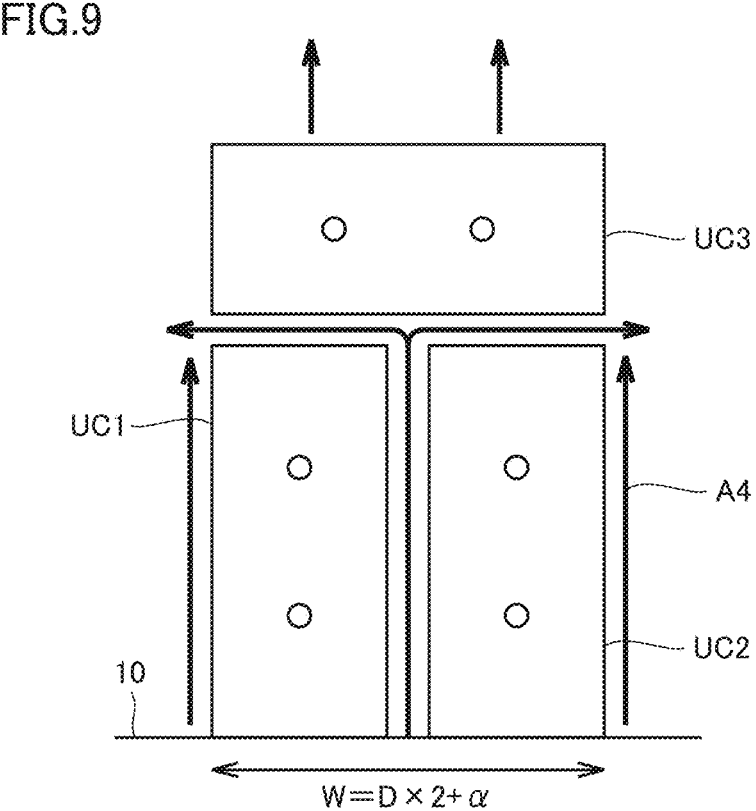
FIG. 9 schematically shows heat dissipation of the unit capacitors according to the present embodiment.

FIG. 9 schematically shows heat dissipation of unit capacitors UC1 to UC3 according to the present embodiment. The solid arrows A4 in the figure indicate an airflow.

As shown in FIG. 9, the heat generated in unit capacitor UC is released outside unit capacitor UC. The heat generated in unit capacitor UC is transferred to the air around unit capacitor UC. As the air is warmed by this heat, the air rises, creating an airflow by natural convection.

In this case, a vertically upward airflow is created in the clearance between unit capacitor UC1 and unit capacitor UC2 by the heat generated in unit capacitors UC1, UC2. This air flows horizontally through the clearance between unit capacitors UC1, UC2 and unit capacitor UC3 to be released. The heat generated in unit capacitor UC3 is released vertically upward mainly from first surface P1.

According to the present embodiment, the heat generated in each of unit capacitors UC1 to UC3 can be released, thus ensuring the cooling performance of unit capacitors UC1 to UC3. Consequently, the performance degradation of unit capacitors UC1 to UC3 can be reduced or prevented.

The installation area of capacitor C is equal to the sum of installation areas of two unit capacitors UC1, UC2 (i.e., the areas of second surfaces P2). The horizontal length of capacitor C is equal to a length twice the length of third side S3 plus size a of a clearance (D×2+a).

In the present embodiment, length W of first side S1 and length D of third side S3 are set to satisfy the relation D×2≤W≤D×3 in the rectangular parallelepiped (see FIG. 3) forming unit capacitor UC.

The horizontal length of capacitor C can be made not less than length W of first side S1 of unit capacitor UC by setting D×2≤W. In the example of FIG. 8, the horizontal length (D×2+a) of capacitor C is equal to length W of first side S1 of unit capacitor UC. This can reduce the installation area of capacitor C to the same level as that of the first comparative example (see FIG. 4). Further, the vertical length of capacitor C can be made equal to that of the first comparative example.

When D×3: W, however, the horizontal length of capacitor C is not less than that of the second comparative example (see FIG. 6) in which unit capacitors UC1 to UC3 are horizontally arranged side by side. The vertical length of capacitor C is larger than that of the first comparative example (see FIG. 4) in which unit capacitors UC1 to UC3 are vertically arranged.

In the present embodiment, thus, length W of first side S1 and length D of third side S3 of unit capacitor UC are set to satisfy the relation D×2≤W≤D×3. This can reduce or prevent an increase in the overall size of capacitor C while ensuring the cooling performance of each of unit capacitors UC1 to UC3.

Modification of the Present Embodiment

Figure 10:
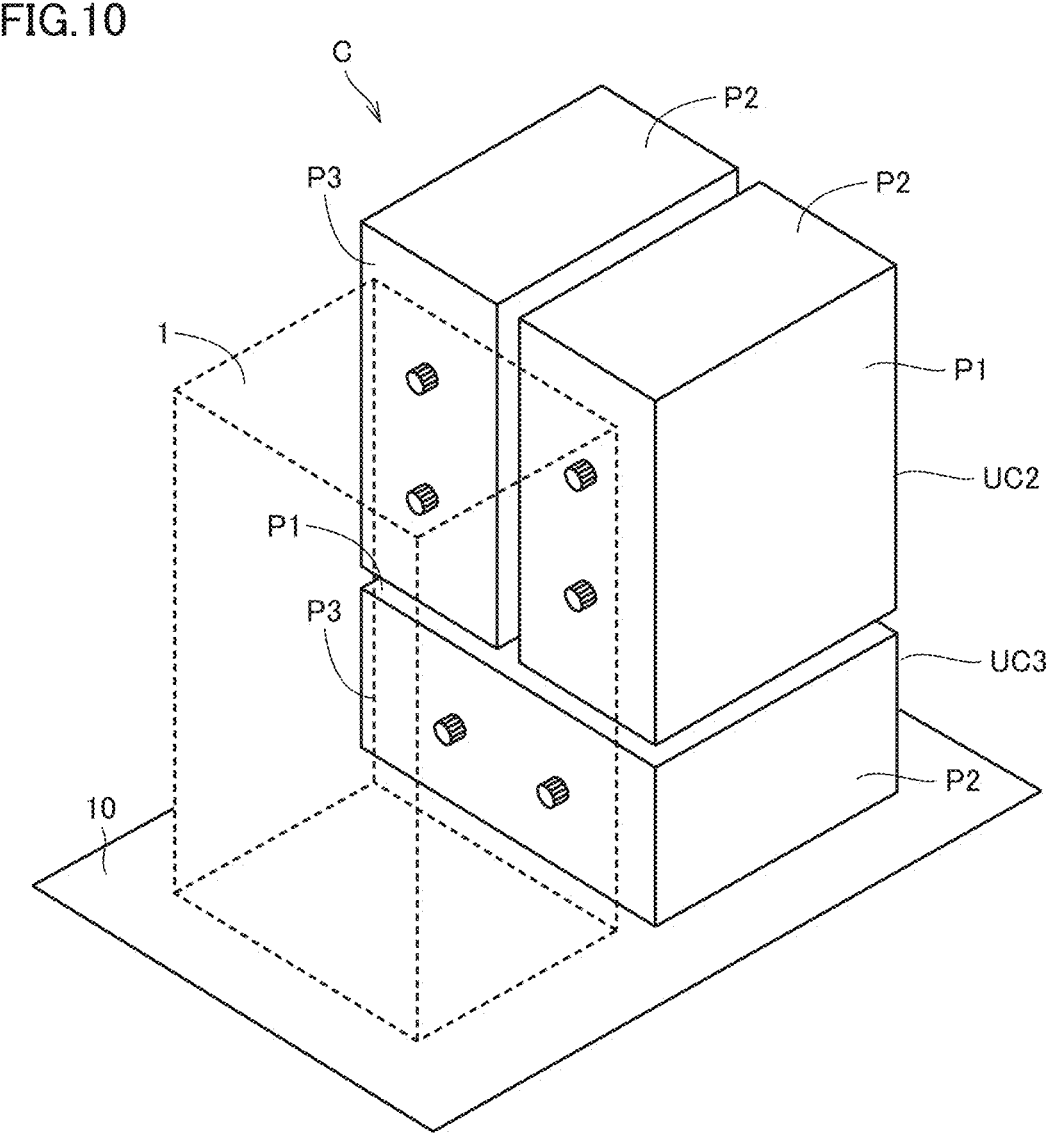
FIG. 10 schematically shows an example arrangement of a power converter and unit capacitors according to a modification of the present embodiment.

Although the example arrangement shown in FIG. 8 describes the configuration in which unit capacitor UC3 is arranged vertically above unit capacitors UC1, UC2, in another configuration, unit capacitor UC3 may be arranged vertically below unit capacitors UC1, UC2 as shown in FIG. 10.

FIG. 10 schematically shows an example arrangement of power converter 1 and unit capacitors UC1 to UC3 according to a modification of the present embodiment.

In the example arrangement of FIG. 10, unit capacitor UC3 is arranged such that first surface P1 thereof is in contact with installation surface 10. Unit capacitors UC1, UC2 are arranged such that second surfaces P2 thereof face first surface P1 of unit capacitor UC3 while being spaced apart from each other.

First surfaces P1 of each of unit capacitors UC1, UC2 are perpendicular to installation surface 10. First surface P1 of unit capacitor UC1 and first surface P1 of unit capacitor UC2 face each other while being spaced apart from each other. Third surfaces P3 of unit capacitors UC1 to UC3 face power converter 1 and are flush with each other.

Figure 11:
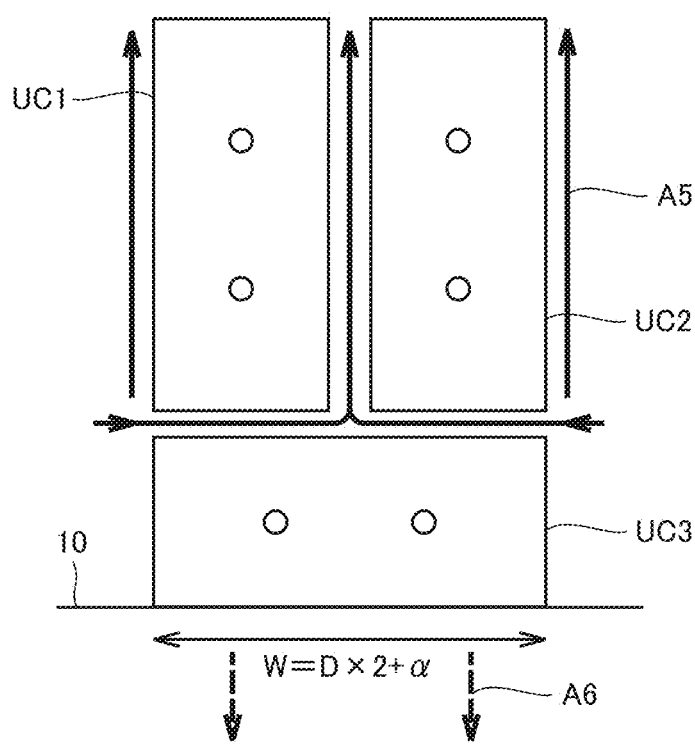
FIG. 11 schematically shows heat dissipation of the unit capacitors according to the modification of the present embodiment.

FIG. 11 schematically shows heat dissipation of unit capacitors UC1 to UC3 according to the modification of the present embodiment. In the figure, the solid arrows A5 indicate an airflow, and the dotted arrows A6 indicate a heat flow.

In the example arrangement of FIG. 10, a vertically upward airflow is created in the clearance between unit capacitor UC1 and unit capacitor UC2 by the heat generated in unit capacitors UC1, UC2. As a result, the air is sucked into the clearance between unit capacitor UC3 and unit capacitors UC1, UC2 and flows horizontally through this clearance. As a result, a flow of air which is sucked horizontally and flows vertically upward is created, as shown in FIG. 11.

The heat generated in unit capacitor UC3 is conducted from first surface P1 to installation surface 10 to be released toward installation surface 10. The heat generated in unit capacitor UC3 further flows horizontally by the air sucked into the clearance between unit capacitor UC3 and unit capacitors UC1, UC2, and then, flows vertically upward through the clearance between unit capacitor UC1 and unit capacitor UC2 to be released.

Also in the example arrangement shown in FIG. 10, thus, the heat generated in each of unit capacitors UC1 to UC3 can be released, thus ensuring the cooling performance of unit capacitors UC1 to UC3. The example arrangement of FIG.

10 can also reduce or prevent an increase in the size of capacitor C as in the example arrangement of FIG. 8.

It should be understood that the embodiments disclosed herein are illustrative and non-restrictive in every respect. The scope of the present disclosure is defined by the scope of the claims, rather than the embodiments described above, and is intended to include any modifications within the scope and meaning equivalent to the scope of the claims.

REFERENCE SIGNS LIST

1 power converter; 2u, 2v, 2w leg circuit; 3 DC circuit; 4 AC circuit; 5 control circuit; 10 installation surface; C capacitor; UC1 to UC3 unit capacitor; Q1 to Q6 switching element; D1 to D6 diode; Np, Nn DC terminal; Nu, Nv, Nw AC input terminal; P1 first surface; P2 second surface; P3 third surface; S1 first side; S2 second side; S3 third side.

The invention claimed is:

1. A power conversion apparatus comprising:
a direct-current (DC) circuit; and
a power converter including a plurality of switching elements, the power converter converting power between the DC circuit and an alternating-current (AC) circuit by a switching operation of the plurality of switching elements, wherein
the DC circuit includes a first capacitor, a second capacitor, and a third capacitor connected in parallel, and the first capacitor, the second capacitor, and the third capacitor each have an identical shape of a rectangular parallelepiped,
the rectangular parallelepiped has a pair of first surfaces facing each other, a pair of second surfaces facing each other, and a pair of third surfaces facing each other,
each of the pair of first surfaces has a first side and a second side orthogonal to each other, each of the pair of second surfaces has the second side and a third side orthogonal to each other, and each of the pair of third surfaces has the third side and the first side orthogonal to each other,
the first side has a length not less than twice and less than three times a length of the third side,
each of the first capacitor and the second capacitor is arranged such that the pair of first surfaces thereof are perpendicular to an installation surface and the pair of second surfaces thereof are horizontal to the installation surface,
one of the pair of first surfaces of the first capacitor faces one of the pair of first surfaces of the second capacitor while being spaced apart from each other, and
the third capacitor is arranged such that
one of the pair of first surfaces thereof faces one of the pair of second surfaces of the first capacitor and one of the pair of second surfaces of the second capacitor while being spaced apart from each other, and
one of the pair of third surfaces thereof is flush with one of the pair of third surfaces of the first capacitor and one of the pair of third surfaces of the second capacitor.

2. The power conversion apparatus according to claim 1, wherein the third capacitor is arranged to be located vertically above the first capacitor and the second capacitor.

3. The power conversion apparatus according to claim 1, wherein the third capacitor is arranged to be located vertically below the first capacitor and the second capacitor.

4. The power conversion apparatus according to claim 1, wherein the power converter has an external shape of a rectangular parallelepiped, and is arranged to face one of the pair of third surfaces of the first capacitor, one of the pair of third surfaces of the second capacitor, and one of the pair of third surfaces of the third capacitor.

5. The power conversion apparatus according to claim 1, wherein each of the first capacitor, the second capacitor, and the third capacitor is a film capacitor.

* * * * *